UNITED STATES PATENT OFFICE.

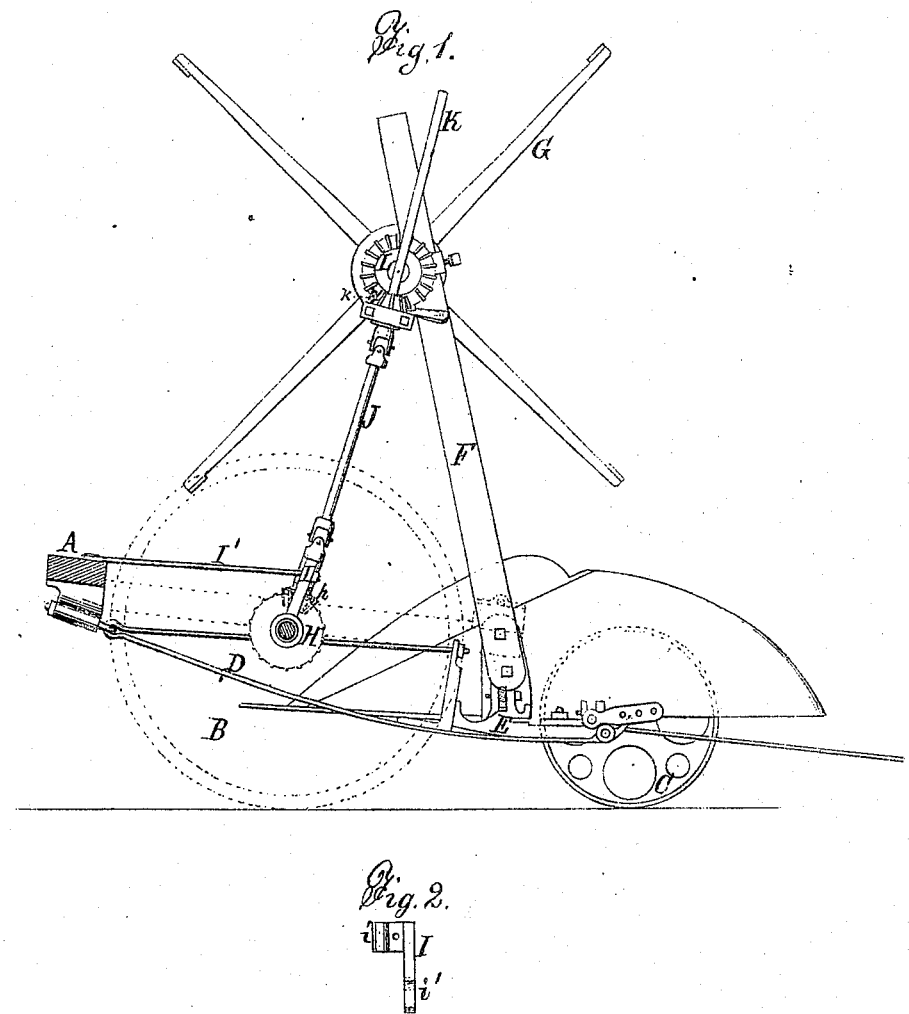

AMOS RANK AND J. H. COX, OF SALEM, OHIO, ASSIGNORS TO AMOS RANK.

IMPROVEMENT IN HARVESTERS.

Specification forming part of Letters Patent No. 86,449, dated February 2, 1869.

*To all whom it may concern:*

Be it known that we, AMOS RANK and JOSHUA H. COX, both of Salem, in the county of Columbiana and State of Ohio, have invented a new and useful Improvement in Harvesters, of which the following is a full, clear, and exact description, reference being had to the accompanying drawings, which make part of this specification, and in which—

Figure 1 represents a view, in elevation, (partly in section,) of so much of a harvester embracing our improvement as is necessary to illustrate our invention; Fig. 2, a view of the bracket which sustains the driving-gear.

Letters Patent of the United States (No. 82,987) were granted to us October 13, 1868, for improvements in harvesters. In that patent the reel was driven by a band and sprocket-wheels.

The invention herein claimed constitutes an improvement on that mode of driving a reel; and consists in a novel method, hereinafter described, of driving a reel mounted on a floating finger-beam by gearing on the main axle and reel-shaft connected by an extensible universally-jointed driving-connection.

Our invention is to be applied to a fully-organized harvester; but a description of parts other than those forming the subject-matter of the invention claimed herein is deemed unnecessary here.

In the accompanying drawings our improvements are shown as applied to a machine such as shown in our former patent, which is one of the class known as "two-wheeled hinged-joint machines."

A represents a portion of the main frame; B, one of the driving-wheels, and C the grain-wheel. D is the drag-bar, on which the shoe E is pivoted. The reel-post F is mounted on this shoe in such manner as to admit of its adjustment backward or forward, as required.

A reel, G, by preference an overhung one, is mounted in a bracket or socket which can be adjusted up and down, as described in our former patent. A bevel-wheel, H, on the main axle drives a corresponding pinion, $h$, on a short shaft turning in a collar, $i$, on a bracket, I. This bracket has an eye, $i'$, on its lower end, which slips over the main axle, and is firmly held in position by a rigid brace, I'.

A link, J, is connected at one end by a universal joint to the shaft carrying the bevel-pinion $h$, and at the other end by a similar joint to a square shaft, K, sliding endwise through a corresponding opening in a bevel-pinion, $k$, mounted on a collar turning in a bearing on the reel-bracket, as shown in our former patent. This pinion $k$ drives a corresponding pinion, L, on the reel-shaft. By this means the reel can be set higher or lower, backward or forward, or allowed to rise and fall independently of the main frame.

Combined rakes and reels have heretofore been driven by gearing and extensible shafts, but in a manner different from ours.

What we claim as our invention, and desire to secure by Letters Patent, is—

1. The combination of the adjustable reel, mounted on a single post over the shoe, of the floating finger-beam with the driving-gearing on the main axle by means of the universal joints, link, and endwise freely-sliding shaft, substantially as and for the purposes specified.

2. The combination, as set forth, of the bracket on the main axle with the brace-rod and short shaft, for the purpose set forth.

In testimony whereof we have hereunto subscribed our names.

AMOS RANK.
J. H. COX.

Witnesses:
THOS. S. BAIRD,
C. W. CADWALLADER.